(12) United States Patent
Venkataraman et al.

(10) Patent No.: US 9,680,175 B2
(45) Date of Patent: Jun. 13, 2017

(54) INTEGRATED FUEL LINE TO SUPPORT CPOX AND SMR REACTIONS IN SOFC SYSTEMS

(75) Inventors: Swaminathan Venkataraman, Cupertino, CA (US); David Weingaertner, Sunnyvale, CA (US); Vlad Kalika, San Jose, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 2320 days.

(21) Appl. No.: 11/905,477

(22) Filed: Oct. 1, 2007

(65) Prior Publication Data
US 2009/0029205 A1 Jan. 29, 2009

Related U.S. Application Data

(60) Provisional application No. 60/935,092, filed on Jul. 26, 2007.

(51) Int. Cl.
| | |
|---|---|
| *H01M 8/06* | (2016.01) |
| *H01M 8/0612* | (2016.01) |
| *H01M 8/04014* | (2016.01) |

(52) U.S. Cl.
CPC ..... *H01M 8/0612* (2013.01); *H01M 8/04014* (2013.01); *Y02E 60/50* (2013.01)

(58) Field of Classification Search
CPC .. H01M 8/0612; H01M 8/04014; Y02E 60/50
See application file for complete search history.

(56) References Cited

U.S. PATENT DOCUMENTS

| | | |
|---|---|---|
| 3,453,087 A | 7/1969 | Herp, Jr. et al. |
| 3,453,146 A | 7/1969 | Bawa et al. |
| 3,488,266 A | 1/1970 | French |
| 3,527,565 A | 9/1970 | Banchik et al. |
| 3,531,263 A | 9/1970 | Sederquist |
| 3,607,419 A | 9/1971 | Keating, Jr. |
| 3,645,701 A | 2/1972 | Banchik et al. |
| 3,718,506 A | 2/1973 | Fischer et al. |
| 3,746,658 A | 7/1973 | Porta et al. |
| 3,972,731 A | 8/1976 | Bloomfield et al. |
| 3,973,993 A | 8/1976 | Bloomfield et al. |
| 3,976,506 A | 8/1976 | Landau |
| 3,982,962 A | 9/1976 | Bloomfield |
| 3,990,912 A | 11/1976 | Katz |
| 4,001,041 A | 1/1977 | Menard |

(Continued)

FOREIGN PATENT DOCUMENTS

| | | | |
|---|---|---|---|
| CN | 2768218 Y | * 3/2006 | ............. H01M 8/04 |
| EP | 0 398 111 A1 | 11/1990 | |

(Continued)

OTHER PUBLICATIONS

Derwent Abstract for Sennoun et al., US 2004/0047800.*

(Continued)

*Primary Examiner* — Raymond Alejandro
(74) *Attorney, Agent, or Firm* — The Marbury Law Group PLLC

(57) ABSTRACT

A fuel cell system comprises at least one fuel cell stack, a CPOX reactor, and a conduit for providing a fuel stream to the at least one fuel cell stack through the CPOX reactor during both a start up and a steady state modes of operation of the system.

6 Claims, 3 Drawing Sheets

(56) References Cited

U.S. PATENT DOCUMENTS

| | | |
|---|---|---|
| 4,004,947 A | 1/1977 | Bloomfield |
| 4,041,210 A | 8/1977 | Van dine |
| 4,098,722 A | 7/1978 | Cairns et al. |
| 4,182,795 A | 1/1980 | Baker et al. |
| 4,190,559 A | 2/1980 | Retallick |
| 4,315,893 A | 2/1982 | Mccallister |
| 4,342,816 A | 8/1982 | Kothmann et al. |
| 4,365,007 A | 12/1982 | Maru et al. |
| 4,374,184 A | 2/1983 | Somers et al. |
| 4,402,871 A | 9/1983 | Retallick |
| 4,430,304 A | 2/1984 | Spurrier et al. |
| 4,473,517 A | 9/1984 | Goedtke et al. |
| 4,473,622 A | 9/1984 | Chludzinski et al. |
| 4,522,894 A | 6/1985 | Hwang et al. |
| 4,532,192 A | 7/1985 | Baker et al. |
| 4,539,267 A | 9/1985 | Sederquist |
| 4,548,875 A | 10/1985 | Lance et al. |
| 4,554,223 A | 11/1985 | Yokoyama et al. |
| 4,567,117 A | 1/1986 | Patel et al. |
| 4,647,516 A | 3/1987 | Matsumura et al. |
| 4,654,207 A | 3/1987 | Preston |
| 4,657,829 A | 4/1987 | Mcelroy et al. |
| 4,670,359 A | 6/1987 | Beshty et al. |
| 4,678,723 A | 7/1987 | Wertheim |
| 4,696,871 A | 9/1987 | Pinto |
| 4,702,973 A | 10/1987 | Marianowski |
| 4,716,023 A | 12/1987 | Christner et al. |
| 4,722,873 A | 2/1988 | Matsumura |
| 4,728,584 A | 3/1988 | Isenberg |
| 4,737,161 A | 4/1988 | Szydlowski et al. |
| 4,792,502 A | 12/1988 | Trocciola et al. |
| 4,808,491 A | 2/1989 | Reichner |
| 4,810,472 A | 3/1989 | Andrew et al. |
| 4,812,373 A | 3/1989 | Grimble et al. |
| 4,820,314 A | 4/1989 | Cohen et al. |
| 4,824,740 A | 4/1989 | Abrams et al. |
| 4,828,940 A | 5/1989 | Cohen et al. |
| 4,847,051 A | 7/1989 | Parenti, Jr. |
| 4,865,926 A | 9/1989 | Levy et al. |
| 4,898,792 A | 2/1990 | Singh et al. |
| 4,904,548 A | 2/1990 | Tajima |
| 4,917,971 A | 4/1990 | Farooque |
| 4,933,242 A | 6/1990 | Koga et al. |
| 4,983,471 A | 1/1991 | Reichner et al. |
| 4,994,331 A | 2/1991 | Cohen |
| 5,009,967 A | 4/1991 | Scheffler |
| 5,034,287 A | 7/1991 | Kunz |
| 5,039,579 A | 8/1991 | Kinoshita |
| 5,047,299 A | 9/1991 | Shockling |
| 5,077,148 A | 12/1991 | Schora et al. |
| 5,079,105 A | 1/1992 | Bossel |
| 5,082,751 A | 1/1992 | Reichner |
| 5,082,752 A | 1/1992 | Koga et al. |
| 5,084,362 A | 1/1992 | Farooque |
| 5,084,363 A | 1/1992 | Reiser |
| 5,091,075 A | 2/1992 | O'neill et al. |
| 5,100,743 A | 3/1992 | Narita et al. |
| 5,143,800 A | 9/1992 | George et al. |
| 5,169,730 A | 12/1992 | Reichner et al. |
| 5,170,124 A | 12/1992 | Blair et al. |
| 5,175,062 A | 12/1992 | Farooque et al. |
| 5,187,024 A | 2/1993 | Matsumura |
| 5,212,022 A | 5/1993 | Takahashi et al. |
| 5,227,256 A | 7/1993 | Marianowski et al. |
| 5,232,792 A | 8/1993 | Reznikov |
| 5,246,791 A | 9/1993 | Fisher et al. |
| 5,270,127 A | 12/1993 | Koga et al. |
| 5,302,470 A | 4/1994 | Okada et al. |
| 5,324,452 A | 6/1994 | Allam et al. |
| 5,328,779 A | 7/1994 | Tannenberger et al. |
| 5,340,664 A | 8/1994 | Hartvigsen |
| 5,344,721 A | 9/1994 | Sonai et al. |
| 5,346,779 A | 9/1994 | Nakazawa |
| 5,348,814 A | 9/1994 | Niikura et al. |
| 5,360,679 A | 11/1994 | Buswell et al. |
| 5,366,819 A | 11/1994 | Hartvigsen et al. |
| 5,441,821 A | 8/1995 | Merritt et al. |
| 5,453,146 A | 9/1995 | Kemper |
| 5,470,360 A | 11/1995 | Sederquist |
| 5,498,487 A | 3/1996 | Ruka et al. |
| 5,501,914 A | 3/1996 | Satake et al. |
| 5,505,824 A | 4/1996 | Mcelroy |
| 5,516,344 A | 5/1996 | Corrigan |
| 5,527,631 A | 6/1996 | Singh et al. |
| 5,573,867 A | 11/1996 | Zafred et al. |
| 5,601,937 A | 2/1997 | Isenberg |
| 5,641,585 A | 6/1997 | Lessing et al. |
| 5,686,196 A | 11/1997 | Singh et al. |
| 5,693,201 A | 12/1997 | Hsu et al. |
| 5,730,213 A | 3/1998 | Kiser et al. |
| 5,733,675 A | 3/1998 | Dederer et al. |
| 5,741,605 A | 4/1998 | Gillett et al. |
| 5,763,114 A | 6/1998 | Khandkar et al. |
| 5,914,200 A | 6/1999 | Schabert et al. |
| 5,955,039 A | 9/1999 | Dowdy |
| 6,013,385 A | 1/2000 | Dubose |
| 6,051,125 A | 4/2000 | Pham et al. |
| 6,106,967 A | 8/2000 | Virkar et al. |
| 6,190,623 B1 | 2/2001 | Sanger et al. |
| 6,221,280 B1 * | 4/2001 | Anumakonda et al. ...... 252/372 |
| 6,280,865 B1 | 8/2001 | Eisman et al. |
| 6,329,090 B1 | 12/2001 | Mcelroy et al. |
| 6,348,278 B1 | 2/2002 | Lapierre et al. |
| 6,370,878 B1 | 4/2002 | Dean et al. |
| 6,376,111 B1 | 4/2002 | Mathias et al. |
| 6,383,670 B1 | 5/2002 | Edlund et al. |
| 6,403,245 B1 | 6/2002 | Hunt |
| 6,423,437 B1 | 7/2002 | Kenyon et al. |
| 6,436,562 B1 | 8/2002 | Dubose |
| 6,451,466 B1 | 9/2002 | Grasso et al. |
| 6,479,177 B1 | 11/2002 | Roberts et al. |
| 6,531,243 B2 | 3/2003 | Thom |
| 6,582,842 B1 | 6/2003 | King |
| 6,623,880 B1 | 9/2003 | Geisbrecht et al. |
| 6,656,625 B1 | 12/2003 | Thompson et al. |
| 6,749,958 B2 | 6/2004 | Pastula et al. |
| 6,821,663 B2 | 11/2004 | Mcelroy |
| 6,828,048 B2 | 12/2004 | Margiott et al. |
| 6,924,053 B2 | 8/2005 | Mcelroy |
| 6,939,635 B2 | 9/2005 | Ballantine et al. |
| 7,067,208 B2 | 6/2006 | Gottmann et al. |
| 7,101,175 B2 | 9/2006 | Deshpande et al. |
| 2001/0049035 A1 | 12/2001 | Haltiner, Jr. et al. |
| 2002/0004154 A1 | 1/2002 | Pastula et al. |
| 2002/0006535 A1 | 1/2002 | Woods et al. |
| 2002/0028362 A1 | 3/2002 | Prediger et al. |
| 2002/0031690 A1 * | 3/2002 | Shimazu et al. ................ 429/19 |
| 2002/0058175 A1 | 5/2002 | Ruhl |
| 2002/0106544 A1 | 8/2002 | Noetzel et al. |
| 2002/0142208 A1 | 10/2002 | Keefer et al. |
| 2002/0192516 A1 | 12/2002 | Tajima |
| 2003/0022052 A1 | 1/2003 | Kearl |
| 2003/0031904 A1 | 2/2003 | Haltiner |
| 2003/0049502 A1 | 3/2003 | Dickman et al. |
| 2003/0054215 A1 | 3/2003 | Doshi et al. |
| 2003/0118881 A1 | 6/2003 | Walsh et al. |
| 2003/0129462 A1 | 7/2003 | Yang et al. |
| 2003/0157386 A1 | 8/2003 | Gottmann |
| 2003/0162067 A1 | 8/2003 | Mcelroy |
| 2003/0196893 A1 | 10/2003 | Mcelroy |
| 2003/0205641 A1 | 11/2003 | Mcelroy |
| 2003/0235725 A1 | 12/2003 | Haltiner et al. |
| 2004/0047800 A1 * | 3/2004 | Sennoun et al. .............. 423/652 |
| 2004/0089438 A1 | 5/2004 | Valensa et al. |
| 2004/0131912 A1 | 7/2004 | Keefer et al. |
| 2004/0163312 A1 | 8/2004 | Bloomfield et al. |
| 2004/0191597 A1 | 9/2004 | Mcelroy |
| 2004/0191598 A1 | 9/2004 | Gottmann |
| 2004/0202914 A1 | 10/2004 | Sridhar et al. |
| 2004/0217732 A1 | 11/2004 | Zhu et al. |
| 2004/0224193 A1 | 11/2004 | Mitlitsky et al. |
| 2004/0224197 A1 | 11/2004 | Kralick |
| 2004/0229092 A1 * | 11/2004 | Take ........................... 429/19 |
| 2005/0026011 A1 | 2/2005 | Suzuki et al. |

(56) References Cited

U.S. PATENT DOCUMENTS

| | | | |
|---|---|---|---|
| 2005/0048334 A1 | 3/2005 | Sridhar et al. | |
| 2005/0048336 A1 | 3/2005 | Takebe et al. | |
| 2005/0048338 A1 | 3/2005 | Kobayashi et al. | |
| 2005/0056412 A1 | 3/2005 | Reinke et al. | |
| 2005/0081444 A1* | 4/2005 | Anumakonda et al. | 48/214 A |
| 2005/0081445 A1* | 4/2005 | Skala et al. | 48/214 A |
| 2005/0164051 A1 | 7/2005 | Venkataraman et al. | |
| 2005/0170235 A1 | 8/2005 | Hu et al. | |
| 2005/0249988 A1 | 11/2005 | Pearson | |
| 2006/0147771 A1 | 7/2006 | Russell et al. | |
| 2006/0213369 A1* | 9/2006 | Edlund et al. | 96/4 |
| 2006/0248799 A1 | 11/2006 | Bandhauer et al. | |
| 2006/0251934 A1 | 11/2006 | Valensa | |
| 2006/0251939 A1 | 11/2006 | Bandhauer et al. | |
| 2006/0251940 A1 | 11/2006 | Bandhauer et al. | |
| 2007/0003806 A1 | 1/2007 | Sarkar et al. | |
| 2007/0017368 A1 | 1/2007 | Levan et al. | |
| 2007/0017369 A1 | 1/2007 | Levan et al. | |
| 2007/0160880 A1* | 7/2007 | Fischer | 429/19 |
| 2007/0196704 A1 | 8/2007 | Valensa | |
| 2007/0231631 A1 | 10/2007 | Venkataraman | |
| 2007/0231635 A1 | 10/2007 | Venkataraman et al. | |
| 2007/0243435 A1 | 10/2007 | Dutta | |
| 2008/0197190 A1 | 8/2008 | Fujita | |
| 2008/0280175 A1 | 11/2008 | Gurunathan | |

FOREIGN PATENT DOCUMENTS

| | | | |
|---|---|---|---|
| EP | 0 977 294 B1 | 2/2000 | |
| EP | 1 501 146 A1 | 1/2005 | |
| JP | 08078035 A * | 3/1996 | H01M 8/04 |
| JP | 2000331698 A * | 11/2000 | H01M 8/04 |
| WO | WO 94/18712 | 8/1994 | |
| WO | WO 2004/013258 | 2/2004 | |
| WO | WO 2004/092756 | 10/2004 | |
| WO | WO 2004/093214 | 10/2004 | |
| WO | WO 2008001119 A2 * | 1/2008 | |

OTHER PUBLICATIONS

Machine translation for Takei, JP 2000-331698 A.*
"Adjust." Dictionary.com. Web. Feb. 13, 2012. <http://dictionary.reference.com/browse/adjust>.*
"Regulate". Dictionary.com. Web. Accessed on: May 18, 2014. <http://dictionary.reference.com/browse/regulate?s=t>.*
International Search Report and Written Opinion mailed Mar. 31, 2009, received in International Application No. PCT/US2008/009069.
Austin, "Cell and Stack Construction: Low-Temperature Cells," *Fuel Cells: A Review of Government-Sponsored Research, 1950-1964*, NASA SP-120, pp. 101-102, (1967).
"Low Cost, Compact Solid Oxide Fuel Cell Generator," (Technology Management Inc.).
"Low Cost, High Efficiency Reversible Fuel Cell (and Electrolyzer) Systems," (Technology Management Inc.), Proceedings of the 2001 DOE Hydrogen Program Review NREL/CP-570-30535, pp. 1-7, (2001).
U.S. Appl. No. 60/461,190, filed Apr. 9, 2003, Mitlitsky et al.
U.S. Appl. No. 60/701,976, filed Jul. 25, 2005, McElroy et al.
U.S. Appl. No. 11/276,717, filed Mar. 10, 2006, Hickey et al.
U.S. Appl. No. 11/503,611, filed Aug. 14, 2006, Valensa et al.
U.S. Appl. No. 11/656,006, filed Jan. 22, 2007, Sridhar et al.
U.S. Appl. No. 11/896,487, filed Aug. 31, 2007, Venkataraman.
U.S. Appl. No. 11/905,051, filed Sep. 27, 2007, Venkataraman.
Milliken et al., "Low Cost, High Efficiency Reversible Fuel Cell Systems," Proceedings of the 2002 U.S. DOE Hydrogen Program Review, NREL/CP-610-32405, pp. 1-14, (2002).
Mitlitsky, et al., "Regenerative Fuel Cells for High Altitude Long Endurance Solar Powered Aircraft," Intersociety Energy Conversion Engineering Conference (IECEC), UCRL-JC-113485, pp. 1-8, (Jul. 28, 1993).
Mitlitsky et al., "Unitized Regenerative Fuel Cells for Solar Rechargeable Aircraft and Zero Emission Vehicles," 1994 Fuel Cell Seminar, UCRL-JC-117130, pp. 1-7, (Sep. 6, 1994).
Hamburger, R. O., et al., "LabView DSC Automates Fuel Cell Catalyst Research", Nov. 4, 2004, http://web.archive.org/web/20041104200039/http://bloomy.com/newsletters/fuelcellresearch.pdf.
Anonymous, Presentation of the LabView-based software used in the Fuel Cell Technologies Testing System. Internet Article, Jul. 15, 2004, http://web.archive.org/web/20040715025135/fuelcelltechnologies.com/Support/Downloads/Tutorial.pdf.
Ruhl, "Low Cost Reversible Fuel Cell System," Proceedings of the 2000 U.S. DOE Hydrogen Program Review, NREL/CP-570-28890, pp. 1-9, (Jun. 15, 2000).
"Small, Ultra Efficient Fuel Cell Systems," (Technology Management Inc.), Advanced Technology Program ATP 2001 Competition, pp. 1-2, (Jun. 2002).
Search Report dated Jan. 7, 2009 received in PCT/US2008/008951.

* cited by examiner

INTEGRATED FUEL LINE TO SUPPORT CPOX AND SMR REACTIONS IN SOFC SYSTEMS

The present application claims benefit of priority of U.S. Provisional Patent Application Ser. No. 60/935,092 filed on Jul. 26, 2007, which is incorporated by reference in its entirety.

BACKGROUND OF THE INVENTION

The present invention is directed generally to a fuel cell system and specifically to a solid oxide fuel cell (SOFC) system with an integrated fuel line.

Some prior art fuel cell systems utilize two fuel lines connected to the fuel cell stacks. One line extends through a catalytic partial oxidizing (CPOX) reactor for providing fuel in a start-up mode, and the other line bypasses said CPOX reactor for providing fuel to the stacks in a steady state mode.

SUMMARY OF THE INVENTION

In one embodiment of the present invention, a fuel cell system comprises at least one fuel cell stack, a catalytic partial oxidizing (CPOX) reactor and only one fuel inlet conduit fluidly connected to at least one fuel cell stack through the CPOX reactor.

In another embodiment, a fuel cell system comprises at least one fuel cell stack, a CPOX reactor and a means for providing a fuel stream to the at least one fuel cell stack through the CPOX reactor during both a start up and a steady state modes of operation of said system.

In one embodiment, a method of operating a fuel cell system comprises providing a fuel inlet stream to a fuel cell stack through a CPOX reactor during both a start up and a steady state mode of operation of the system.

In one embodiment, a fuel cell system comprises at least one fuel cell stack, a CPOX reactor and a means for at least partially vaporizing a liquid fuel using heat from the CPOX reactor.

In another embodiment, a fuel cell system comprises at least one fuel cell stack, a CPOX reactor, and a conduit which is located in a heat transfer relationship the CPOX reactor, wherein an inlet of the conduit is fluidly connected to a liquid fuel source, an outlet of the conduit is connected to an inlet of the CPOX reactor, and an outlet of the CPOX reactor is fluidly connected to an inlet of at least one fuel cell stack.

In yet another embodiment, a method of operating a fuel cell system comprises flowing a liquid fuel stream in sufficient proximity to a CPOX reactor such that heat from the CPOX reactor vaporizes at least a portion of the liquid fuel to form a vaporized fuel, providing the vaporized fuel into the CPOX reactor and providing the vaporized fuel from the CPOX reactor to at least one fuel cell stack.

DETAILED DESCRIPTION OF THE PREFERRED EMBODIMENTS

In one embodiment of the present invention, a fuel cell system comprises at least one fuel cell stack, a catalytic partial oxidization (CPOX) reactor and only one fuel inlet conduit fluidly connected to at least one fuel cell stack through the CPOX reactor.

In another embodiment, a fuel cell system comprises at least one fuel cell stack, a CPOX reactor and a means for providing a fuel inlet stream to the at least one fuel cell stack through the CPOX reactor during both a start up and a steady state modes of operation of the system. The means for providing a fuel stream to the at least one fuel cell stack through the CPOX reactor comprises a fuel inlet conduit.

The fuel inlet conduit, fluidly connects a fresh fuel source (e.g. a main fuel line, such as a natural gas line, or a fuel tank, such as a hydrocarbon fuel tank, etc.) to at least one stack through the CPOX reactor. The term "fluidly connected" means directly or indirectly connected such that fuel can flow directly or indirectly from the source to the stack. As such, the fuel inlet conduit may traverse other fuel cell system components before reaching at least one fuel cell stack. Such components can include, but are not limited to a mixer or a reformer.

In one embodiment, the fuel inlet conduit comprises a split or a plurality of splits for fluidly connecting to a plurality of stacks. In either case, said conduit is preferably split down stream from the CPOX reactor (i.e. after passing through the CPOX reactor).

In one aspect of the present embodiments, all fresh fuel provided to the fuel cell system, whether said system is in start-up or steady state operating mode, passes through the CPOX reactor. As used herein "fresh fuel" describes fuel that is introduced to the fuel cell system from an external source (as opposed to fuel recycled in the system).

The CPOX reactor catalyzes fuel conversion reactions in the start-up operating mode, and acts as a "dummy unit" in the steady state mode. For instance, when the fuel cell system reaches steady state, air flow to the CPOX reactor is shut off. At this time fuel still flows through the CPOX reactor, even though essentially no CPOX reaction is taking place.

Fuel cell systems may optionally employ one or more mixers throughout the system. In a particular embodiment, at least one mixer is located outside of the hot box for mixing the fuel inlet stream, a fuel recycle stream and steam.

Figure 1A:
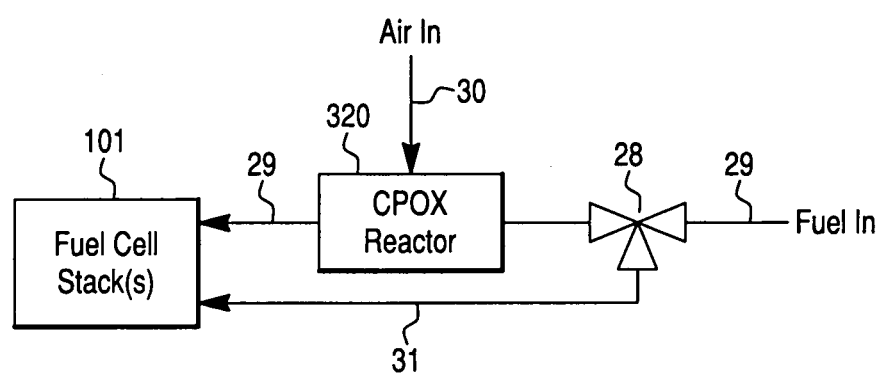
FIG. 1A is a generalized schematic of a typical prior art fuel cell system.
Figure 1B:
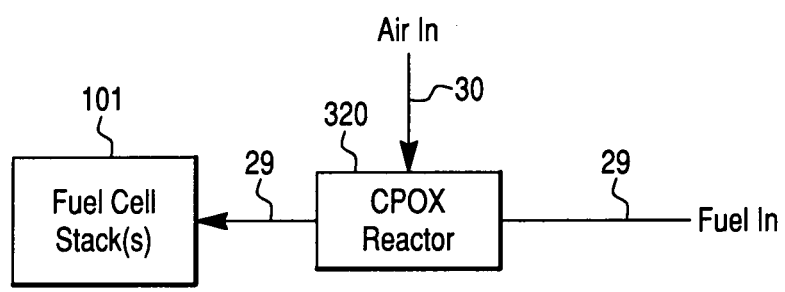
FIG. 1B is a generalized schematic of a fuel cell system according the embodiments of the invention according to an embodiment.

FIGS. 1A and 1B depict generalized schemes for providing fuel to one or more fuel cell stack(s) 101 in accordance with one type of prior art fuel cell system and a fuel cell system of the present embodiments, respectively.

As shown in FIG. 1A, during start-up mode while the stack(s) 101 are warming up, one or more valves 28 are positioned to direct a hydrocarbon fuel into the CPOX reactor 320 while no fuel flows into the bypass conduit 31. Air is provided into the CPOX reactor via the air inlet conduit 30 to run the CPOX reaction. A fuel inlet stream comprising hydrogen and $CO_2$ flows from the CPOX reactor 320 via the fuel inlet conduit 29 to the fuel cell stack(s) 101. During steady state mode, after the stack(s) are warmed up to steady state operating temperature, the valve(s) 28 are switched to shut off fuel flow to the CPOX reactor 320 and to allow fuel to flow directly to stack(s) 101 via the bypass conduit 31.

In the configuration of FIG. 1B, fuel flows to the stack(s) 101 through the CPOX reactor 320, via a fuel inlet conduit 29, during both start-up and steady state modes. In this configuration, the CPOX reaction can be turned on and off by turning on and off the air flow to the CPOX reactor via the air inlet conduit 30.

The design of FIG. 1B is simpler and less expensive than in the prior art systems of FIG. 1A. The present embodiments provide a design which reduces the number of mass flow controllers, piping and associated parts. For example, then number of fuel inlet conduits 29/31 and the associated valves 28 are reduced. The configuration shown in FIG. 1B also avoids seepage of fuel and steam through the CPOX line which is typically an issue with configuration of FIG. 1A when the CPOX reactor 320 is shut off. It should be noted however, that FIG. 1B is not intended to limit the scope of the present embodiments and merely provides a comparative illustration of the fuel cell systems.

In the present embodiments, the control system is also made more simple. For example, air flow from the air inlet conduit 30 to the CPOX reactor 320 can be regulated to turn the air on or off to control whether the CPOX reactions occurs or not in the CPOX reactor. This method also avoids temperature spikes when the main fuel is introduced.

The issue of coking is also effectively dealt with in the present embodiments, since continued gas flow through the CPOX line keeps the line at a cooler temperature. In other designs, a small amount of water is usually injected into the CPOX line to avoid coking.

In one embodiment, a method of operating a fuel cell system comprises providing a fuel inlet stream to a fuel cell stack through a CPOX reactor 320 during both a start-up and a steady state mode of operation of the system. During a start up mode, natural gas is converted to hydrogen and CO containing stream in a catalytic partial oxidation reaction. Accordingly, all fresh fuel provided to the at least one fuel cell stack passes through the CPOX reactor 320.

A CPOX air blower controls air flow into the CPOX reactor 320, effectively controlling CPOX reactions when the fuel is continuously flowing through. As the fuel cell system nears steady state conditions, air flow to the CPOX reactor 320 can be continuously decreased and eventually shut off.

Figure 2:
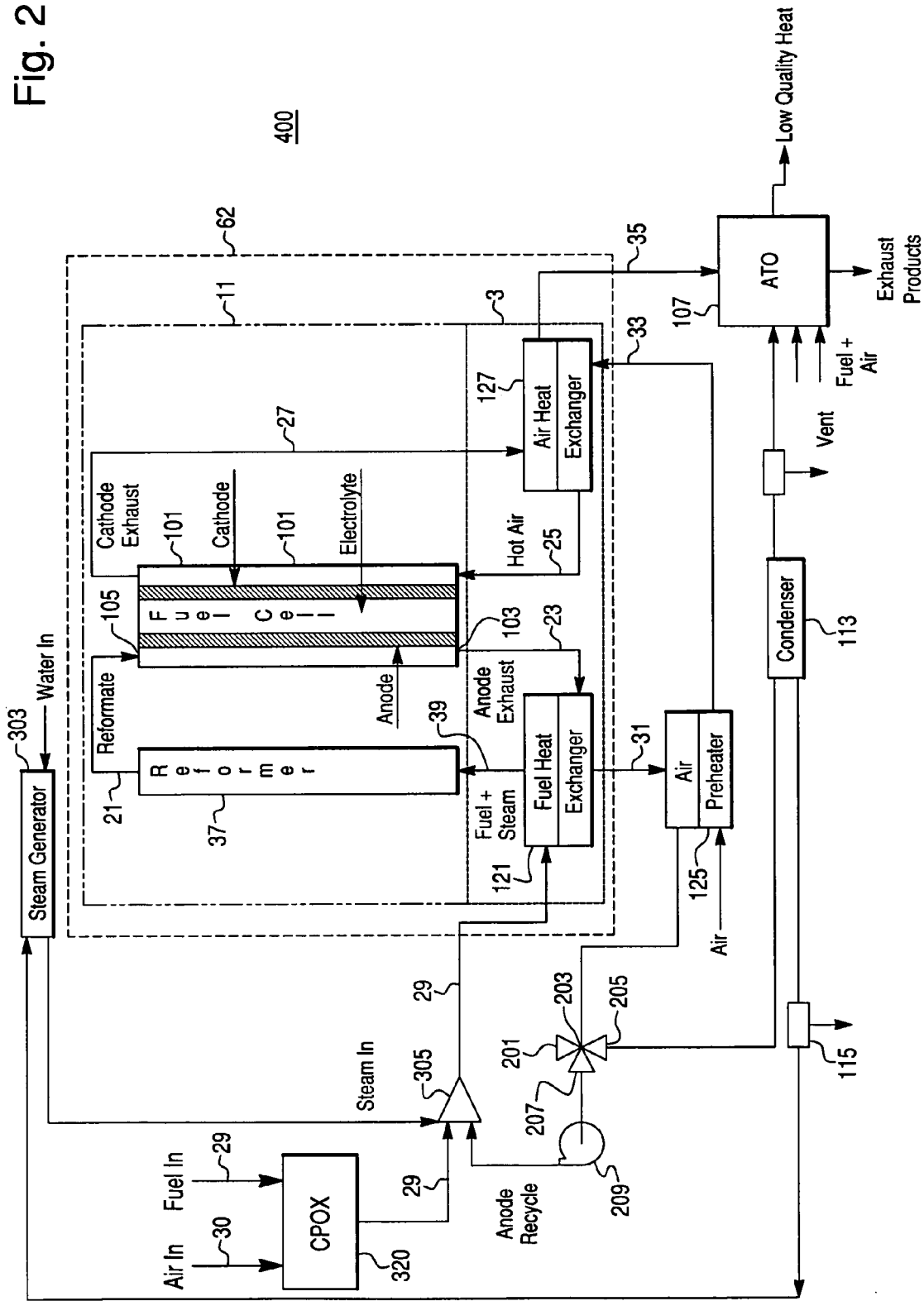
FIG. 2 is schematic diagram of a fuel cell system according an embodiment.

FIG. 2 is a non-limiting example a fuel cell system 400. Each fuel cell stack module includes at least one fuel cell stack 101 and a cover shell or dome 11 covering the stack(s) 101. For example, a single fuel cell stack 101 may be located under the shell 11. Alternatively, two or more stacks 101 may be located under the shell 11. The stacks 101 may be stacked vertically and/or horizontally under each shell 11. If desired, the vertically stacked fuel cell stacks 101 may be provided in a cascade configuration, where the fuel exhaust stream from one stack is used as the inlet fuel stream for an adjacent stack.

As shown in FIG. 2, a CPOX reactor 320 receives fuel and air via a fuel inlet conduit 29, and an air inlet conduit 30, respectively. A single fuel inlet conduit 29 connects the CPOX reactor 320 to the mixer 305. In some cases the fuel inlet conduit 29 bypasses the mixer 305 before entering the hot box 62. The mixer can have inlets connected to a fuel cell stack, fuel recycle conduit and to a steam generator and an outlet connected to the fuel inlet conduit The stacks 101 may comprise any suitable fuel cells. For example, the fuel cells may comprise solid oxide fuel cells having a ceramic oxide electrolyte. Other fuel cell types, such as PEM, molten carbonate, phosphoric acid, etc. may also be used. The stacks 101 may comprise externally and/or internally manifolded stacks. For example, the stacks may be internally manifolded for fuel and air with fuel and air risers extending through openings in the fuel cell layers and/or in the interconnect plates between the fuel cells. Alternatively, the fuel cells may be internally manifolded for fuel and externally manifolded for air, where only the fuel inlet and exhaust risers extend through openings in the fuel cell layers and/or in the interconnect plates between the fuel cells. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The cover shell 11 may have any suitable configuration. For example, the cover shell 11 may have a cylindrical configuration with an optional dome-shaped upper portion. However, the shell 11 may have a polygonal or oval horizontal cross section and/or it may have a tapered rather than flat upper surface. The shell may be made of any suitable thermally insulating or thermally conductive material, such as metal, ceramic, etc.

The stack(s) 101 and the shell 11 are removably positioned or removably connected to an upper surface of a base 3. Preferably, each fuel cell stack 101 and the cover shell 11 are separately removably connected to the upper surface of the base 3. In this case, the shell 11 may be easily removed from the upper surface of the base 3 without removing the stack(s) 101 under the shell 11. Alternatively, if the shell 11 contains a door or a hatch, then the stack(s) 101 under the shell 11 may be easily removed through the door or hatch without removing the shell 11.

The term "removably connected" means that the stack(s) 101 and/or the shell 11 are connected to the upper surface of the base 3 in such a way as to be easily removed for repair or servicing. In other words, "removably connected" is an opposite of "permanently connected". For example, the stacks 101 and/or the shell 11 are removably connected to the upper surface of the base 3 by at least one of a snap fit connection, a tension fit connection, a fastening connection or a slide rail connection. An example of a snap fit connection is a bayonet type connection in which one or more prongs which hold a component in place by hooking into an opening are pressed inward or outward to unhook them from the opening. An example of a tension fit connection is where a component, such as a stack 101 or a shell 11, is pressed into an opening or groove in the surface of the base 3 which has the about same size as the cross section of the stack 101 or the shell 11 such that tension holds the stack or the shell in the opening or groove. An example of a fastening connection is connection by a fastener, such as a bolt or a clip, which can be removed by service personnel. An example of a slide rail connection is a drawer or dove tail type connection, such as a groove in the upper surface of the base 3 into which a protrusion in the stack 101 can be slid into, or a groove in the bottom stack 101 plate into which a protrusion in the upper surface of the base 3 can be slid into. For example, the upper surface of the base 3 may contain openings for holding the stacks 101 by tension and/or rail grooves for sliding the stacks 101 into place. Other removable connection types may be used. An example of a permanent connection is a welded connection, such as where the shell 11 is welded to the surface of the base 3.

The stack(s) 101 and the shell 11 may be removably connected using a different type of connection from each other. Furthermore, the shell 11 may be removably connected to the upper surface of the base 3, while the stack(s) 101 may be non-removably connected to the same surface.

Preferably, at least one heat exchanger is located in the interior volume of the base 3. For example, for stacks which are internally manifolded for fuel and air, both fuel 121 and air 125 heat exchangers or a single multi-stream heat exchanger may be located in the interior volume of the base 3. For stacks 101 that are internally manifolded for fuel but externally manifolded for air, the fuel heat exchanger may be located in the interior volume of the base 3. The fuel 121 and air 125 heat exchangers provide heat from the fuel and air exhaust streams, respectively, to fuel and air inlet streams, respectively. The heat exchangers may be located side by side or stacked vertically in the interior volume of the base 3. There may be one fuel 121 and one air 125 heat exchanger for each module. However, if desired, more than one fuel 121 and/or more than one air 125 heat exchanger may be provided.

The system 100 also contains a condenser 113 and water separator 115 having an inlet which is operatively connected to a fuel cell stack fuel exhaust 103 and an outlet which may be operatively connected to an inlet of a three way valve 201. The condenser 113 and water separator 115 may comprise a single device which condenses and separates water from the fuel exhaust stream or they may comprise separate devices. For example, the condenser 113 may comprise a heat exchanger where the fuel exhaust stream is cooled by a cool counter or co-flow air stream to condense the water. The air stream may comprise the air inlet stream into the fuel cell stack 101 or it may comprise a separate cooling air stream. The separator 115 may comprise a water tank which collects the separated water. It may have a water drain used to remove and/or reuse the collected water.

The system 400 also contains a recuperative heat exchanger 121 which exchanges heat between the stack fuel exhaust stream and the hydrocarbon fuel inlet stream being provided from the fuel inlet conduit 29. The heat exchanger helps to raise the temperature of the fuel inlet stream and reduces the temperature of the fuel exhaust stream so that it may be further cooled in the condenser and such that it does not damage the humidifier.

If the fuel cells are external fuel reformation type cells, then the system 400 contains a fuel reformer 37. The reformer 37 reforms a hydrocarbon fuel inlet stream into hydrogen and carbon monoxide containing fuel stream which is then provided into the stack 101. The reformer 37 may be heated radiatively, convectively and/or conductively by the heat generated in the fuel cell stack 101 and/or by the heat generated in an optional burner/combustor, as described in U.S. patent application Ser. No. 11/002,681, filed Dec. 2, 2004, incorporated herein by reference in its entirety. Alternatively, the external reformer 37 may be omitted if the stack 101 contains cells of the internal reforming type where reformation occurs primarily within the fuel cells of the stack.

Optionally, the system 400 also contains an air preheater heat exchanger 125. This heat exchanger 125 heats the air inlet stream being provided to the fuel cell stack 101 using the heat of the fuel cell stack fuel exhaust. If desired, this heat exchanger 125 may be omitted.

The system 400 also preferably contains an air heat exchanger 127. This heat exchanger 127 further heats the air inlet stream being provided to the fuel cell stack 101 using the heat of the fuel cell stack air (i.e., oxidizer or cathode) exhaust. If the preheater heat exchanger 125 is omitted, then the air inlet stream is provided directly into the heat exchanger 127 by a blower or other air intake device.

The system may also contain an optional water-gas shift reactor (not shown). The water-gas shift reactor may be any suitable device which converts at least a portion of the water and carbon monoxide in the fuel exhaust stream into free hydrogen and carbon dioxide. For example, the reactor may comprise a tube or conduit containing a catalyst which converts some or all of the carbon monoxide and water vapor in the fuel exhaust stream into carbon dioxide and hydrogen. Thus, the reactor increases the amount of hydrogen in the fuel exhaust stream. The catalyst may be any suitable catalyst, such as a iron oxide or a chromium promoted iron oxide catalyst. The reactor may be located between the fuel heat exchanger 121 and the air preheater heat exchanger 125.

If desired, a steam generator 303 may also be added to the system 400. The steam generator 303 is provided with water from a water source, such as a water tank and/or from the condenser 113 and water separator 115, and converts the water to steam. The steam is mixed with the inlet fuel stream in a mixer 305. The steam generator may be heated by a separate heater and/or by the hot cathode exhaust stream and/or by the low quality heat generated by the anode tailgas oxidizer (ATO) 107. If desired, the ATO 107 may be thermally integrated with the stack 101. Furthermore, the low quality heat generated by the ATO 107 may be used to heat the reformer instead of or in addition to heating the steam generator 303. The exhaust products of the ATO 107 may be provided into the air inlet stream directed into the fuel cell stack. FIG. 2 also illustrates the location of the hot box 62 which may contain one or more fuel cell stack modules. The steam generator 303 and the air preheater 125 may be located in a separate hot box annex which is placed in contact with the hot box 62. For example, the hot box annex may comprise a separate container located on top of the hot box.

Preferably, the system 400 contains a second fuel recycle or compressor 209 which provides the fuel exhaust stream into the fuel inlet stream. Specifically, the outlet 207 of the valve 201 is operatively connected to an inlet of the blower or compressor 209, while an outlet of the blower or compressor 209 is connected to the hydrocarbon fuel inlet line 29 (fuel inlet conduit). In operation, the blower or compressor 209 controllably provides a desired amount of the fuel cell stack fuel exhaust stream into the fuel cell stack fuel inlet stream. In one aspect of this embodiment, the device 209 is a low temperature blower which operates at a temperature of 200 degrees Celsius or less. In this case, the heat exchangers 121 and 125 lower the temperature of the fuel exhaust stream to 200 degrees Celsius or less to allow the use of the low temperature blower 209.

The system 400 operates as follows. The fuel inlet stream can be combined with a portion of the fuel exhaust stream such that hydrogen and humidity (i.e., water vapor) from the fuel exhaust stream is added to the fuel inlet stream. The humidified fuel inlet stream then passes through the fuel heat exchanger 121 where the humidified fuel inlet stream is heated by the fuel cell stack fuel exhaust stream. The heated and humidified fuel inlet stream is then provided into a reformer 37, which is preferably an external reformer. For example, reformer 37 may comprise a reformer described in U.S. patent application Ser. No. 11/002,681, filed on Dec. 2, 2004, incorporated herein by reference in its entirety. The fuel reformer 37 may be any suitable device which is capable of partially or wholly reforming a hydrocarbon fuel to form a carbon containing and free hydrogen containing fuel. For example, the fuel reformer 37 may be any suitable device which can reform a hydrocarbon gas into a gas mixture of free hydrogen and a carbon containing gas. For example, the fuel reformer 37 may comprise a catalyst coated passage where a humidified biogas, such as natural gas, is reformed via a steam-methane reformation reaction to form free hydrogen, carbon monoxide, carbon dioxide, water vapor and optionally a residual amount of unreformed biogas. The free hydrogen and carbon monoxide are then provided into the fuel (i.e., anode) inlet 105 of the fuel cell stack 101. Thus, with respect to the fuel inlet stream, which is located upstream of the reformer 37 which is located upstream of the stack 101.

The air or other oxygen containing gas (i.e., oxidizer) inlet stream is preferably provided into the stack 101 through a heat exchanger 127, where it is heated by the air (i.e., cathode) exhaust stream from the fuel cell stack. If desired, the air inlet stream may also pass through the condenser 113 and/or the air preheat heat exchanger 125 to further increase the temperature of the air before providing the air into the stack 101.

The fuel exhaust stream from the stack 101 is first provided into the heat exchanger 121, where its temperature is lowered, preferably to less than 200 degrees Celsius, while the temperature of the fuel inlet stream is raised. If the air preheater heat exchanger 125 is present, then the fuel exhaust stream is provided through this heat exchanger 125 to further lower its temperature while raising the temperature of the air inlet stream. The temperature may be lowered to 90 to 110 degrees Celsius for example.

Preferably, the fuel exhaust stream is first provided through the heat exchanger 121, reactor 128 and heat exchanger 125 before being provided into the valve 201 through inlet 203. The fuel exhaust stream is cooled to 200 degrees Celsius or less, such as to 90 to 180 degrees, in the heat exchanger 125 prior to being provided into the valve 201 where it is separated into two streams. This allows the use of a low temperature blower 209 to controllably recycle a desired amount of the first fuel exhaust stream into the fuel inlet stream, since such blower may be adapted to move a gas stream which has a temperature of 200 degrees Celsius or less.

The first fuel exhaust stream is provided from valve 201 outlet 207 into the fuel recycle blower or compressor 209 which recycles this stream into the fuel inlet stream. The device 209 may be computer or operator controlled and may vary the amount of the fuel exhaust stream being provided into the fuel inlet stream depending on any suitable parameters.

The second fuel exhaust stream provided from valve 201 is not subjected to hydrogen separation. Instead, the second fuel exhaust stream provided from the valve 201 is either vented or provided to the ATO 107.

In another embodiment, the fuel cell system can be configured to utilize liquid fuels. CPOX reactors are vapor phase reactors. Staring up a fuel cell system containing a CPOX reactor using a liquid fuel (e.g. ethanol, denatured alcohol, gasoline, kerosene and other hydrocarbons) is likely to require that the liquid fuel be vaporized prior to feeding it into the CPOX reactor. This vaporization requires heat. One way to provide the heat is integrate the heat exchange for vaporization with the CPOX reactor. Stated differently, heat from the CPOX reactor may be utilized to vaporize the liquid fuel. For example, the liquid fuel conduit can be located in a heat transfer relationship with the CPOX reactor.

In one embodiment, a fuel cell system comprises at least one fuel cell stack, a CPOX reactor and a means for at least partially vaporizing a liquid fuel using heat from the CPOX reactor. The means for at least partially vaporizing a liquid fuel can comprise a conduit wrapped around the CPOX reactor. For example, the conduit can comprise a coaxial jacket surrounding the CPOX reactor, or a pipe which is coiled around the CPOX reactor. Other conduit configurations can also be used. An inlet of the conduit is fluidly connected to a liquid fuel source, an outlet of the conduit is connected to an inlet of the CPOX reactor, and an outlet of the CPOX reactor is fluidly connected to an inlet of at least one fuel cell stack. As used herein "fluidly connected" denotes direct or indirect connection between two points, wherein a fluid can travel from one point to the other.

Figure 3:
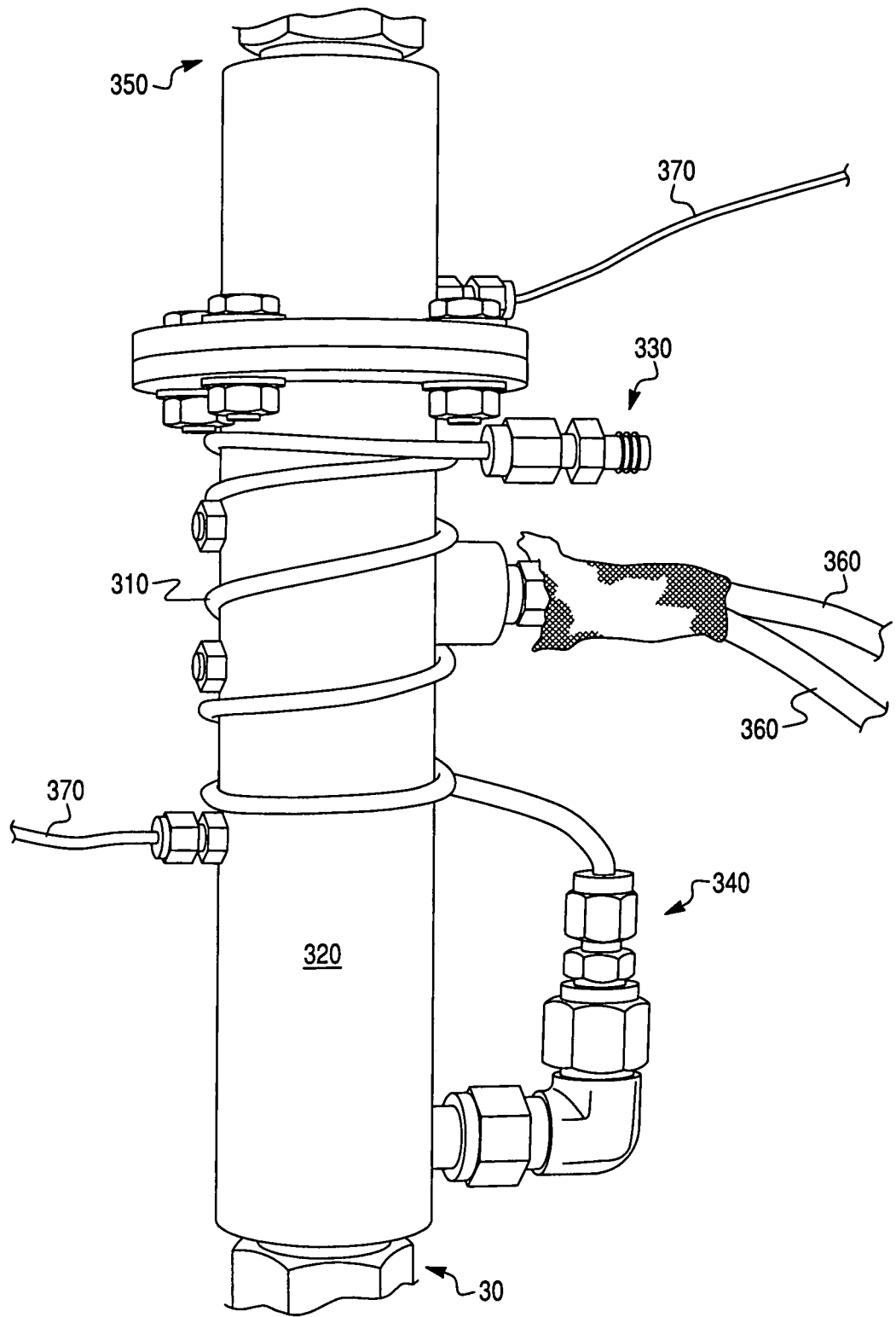
FIG. 3 is a photograph of a CPOX reactor wrapped with a fuel conduit.

FIG. 3 depicts a non-limiting example of this embodiment, wherein a fuel conduit 310 which corresponds to conduit 29 in FIGS. 1B and 2, is wrapped around a CPOX reactor 320. Liquid fuel is fed into the fuel conduit 310 through an inlet 330 of the fuel conduit 310 and the vaporized (or partially vaporized) fuel is fed from an outlet 340 of the fuel conduit 310 into the CPOX reactor 320. Air is provided to the CPOX reactor 320 via the air inlet conduit 30 to run the CPOX reactions. Reacted fuel is fed from the CPOX fuel outlet 350 to the fuel cell stack(s). FIG. 3 also shows the electrical leads 360 for a glow plug that can be used for initial heating of the CPOX reactor and thermocouple leads 370.

While a coiled pipe 310 is shown in FIG. 3, in an alternative configuration, a liquid fuel is fed to a jacket located around the CPOX reactor, around the CPOX outlet tube or both. The jacket may comprise a shell located concentrically around the CPOX reactor and/or outlet tube. In yet another alternative configuration, a liquid fuel is fed to one or more tubes that run inside the CPOX reactor. In this configuration, the CPOX reactor comprises a concentric shell located around the fuel inlet tube.

A method of operating a fuel cell system of this embodiment comprises flowing a liquid fuel stream in sufficient proximity to a CPOX reactor 320, such as through conduit 310. The heat from the CPOX reactor vaporizes at least a portion of the liquid fuel, providing the vaporized fuel into the CPOX reactor. The vaporized fuel is provided from the CPOX reactor 320 to at least one fuel cell stack 101. Preferably, all the liquid fuel is vaporized. While a cylindrical CPOX reactor was described, CPOX reactors with other geometric configurations may also be used.

Heat transfer may be augmented with additional external heating elements such as heating tape located on the outside of the fuel conduit or a heating element (such as a heat tape or glow plug) located on the fuel line extending from the preheated liquid fuel outlet to the air/preheated fuel mixer upstream of the CPOX reactor. This may also allow the CPOX reactor to be cold started on a liquid fuel.

A test run was done using standard CPOX reactor 320 shown in FIG. 3. An evaporating coil 310 was wrapped around the body of a cylindrical CPOX reactor, 320 ⅛" diameter by 27" contact length. A glow plug was turned on for 5 min to preheat the catalyst and the evaporating coil. Ethanol flow for startup was 3.5 ml/min (equivalent of 2 slpm of natural gas). Air to fuel ratio of 2.0 was maintained for the test. Operating temperatures and exhaust composition measured using GC indicated good conversion of liquid fuel to partially oxidized fuel stream comprising hydrogen and $CO_2$.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The fuel cell systems described herein may have other embodiments and configurations, as desired. Other components may be added if desired, as described, for example, in U.S. application Ser. No. 10/300,021, filed on Nov. 20, 2002, in U.S. Provisional Application Ser. No. 60/461,190, filed on Apr. 9, 2003, and in U.S. application Ser. No. 10/446,704, filed on May 29, 2003 all incorporated herein by reference in their entirety. Furthermore, it should be understood that any system element or method step described in any embodiment and/or illustrated in any figure herein may also be used in systems and/or methods of other suitable embodiments described above, even if such use is not expressly described.

What is claimed is:

1. A method of operating a fuel cell system comprising at least one fuel cell stack, a catalytic partial oxidizing (CPOX) reactor and a fuel reformer located downstream of the CPOX reactor, said method comprising:

providing a fuel inlet stream to the fuel cell stack through the CPOX reactor and the fuel reformer during both a start-up and a steady state mode of operation of the system;

providing air into the CPOX reactor during the start-up mode; and regulating air provided to the CPOX reactor as the system nears steady state conditions by controlling air flow into the CPOX reactor with an air blower by shutting off the air blower once the system approaches steady state, wherein all fuel provided to the at least one fuel cell stack always passes through the CPOX reactor and the fuel reformer throughout both start-up and steady state modes; and wherein the CPOX reactor is located outside a hot box and the fuel reformer and the fuel cell stack are located inside the hot box.

2. The method of claim 1, wherein the step of regulating air provided to the CPOX reactor as the system nears steady state conditions by controlling air flow into the CPOX reactor with an air blower further comprises controlling the air blower to provide continuously less air to the CPOX reactor as the system nears steady state prior to shutting off the air blower.

3. The method of claim 1, wherein said fuel cell system comprises a fuel inlet conduit connecting a fresh fuel source to the at least one fuel cell stack through a CPOX reactor.

4. The method of claim 3, further comprising mixing an anode exhaust stream with steam to generate a humidified anode exhaust stream and combining the fuel inlet stream with the humidified anode exhaust stream.

5. The method of claim 1, wherein the CPOX reactor does not catalyze a fuel reaction during the steady state mode.

6. The method of claim 1, wherein the step of providing the fuel inlet stream to the fuel cell stack through the CPOX reactor comprises flowing a liquid fuel inlet stream in sufficient proximity to the CPOX reactor such that heat from the CPOX reactor vaporizes at least a portion of the liquid fuel to form a vaporized fuel followed by providing the vaporized fuel into the CPOX reactor.

* * * * *